(12) United States Patent
Kobayashi et al.

(10) Patent No.: US 6,310,744 B1
(45) Date of Patent: *Oct. 30, 2001

(54) MAGNETIC TAPE APPARATUS

(75) Inventors: Masayoshi Kobayashi, Yamato; Tsuneyoshi Oohara, Kawasaki, both of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,389

(22) Filed: Feb. 1, 1999

(51) Int. Cl.[7] .................................................... G11B 5/008
(52) U.S. Cl. ............................................................. 360/96.1
(58) Field of Search .............................. 360/96.1, 130.21, 360/130.22, 96.2, 96.4

(56) References Cited

U.S. PATENT DOCUMENTS 4,646,186 * 2/1987 Tsuchiya et al. .................. 360/96.1

FOREIGN PATENT DOCUMENTS 5-128798 * 5/1993 (JP) ..................................... 360/96.1

* cited by examiner

Primary Examiner—Allen Cao

(57) ABSTRACT

A magnetic tape apparatus for reading data from and writing data to a magnetic tape has a magnetic head for reading or writing the data, and first and second tape guides. The first tape guide has a first guide surface to guide the magnetic tape, and the first guide surface has a width that is narrower than the width of the magnetic tape. The second tape guide has a second guide surface to guide the magnetic tape, and the second guide surface has a width that is wider than the width of the magnetic tape. If the tape moves laterally against a flange on the first tape guide, the flange initially yields to the pressure of the tape. Then the flange presses against the magnetic tape to return the tape to a laterally aligned position along a tape path.

18 Claims, 10 Drawing Sheets

Fig. 7

MECHANICAL CHARACTERISTIC OF TAPE

| | TAPE WIDTH (mm) | TAPE THICKNESS (μm) | | TAPE RIGIDITY EI(N·mm²) | |
|---|---|---|---|---|---|
| | | ANSI | ACTUAL MEASUREMENT | ANSI | CALCULATED |
| ORDINARY LENGTH CHROMIUM TAPE | 12.65±0.025 | 25.9~33.7 | 28 | 0.06~0.16 | 0.136 |
| DOUBLE-LENGTH CHROMIUM TAPE | 12.573±0.025 | 16.1~17.7 | 18 | 0.03~0.14 | 0.036 |
| ORDINARY LENGTH METAL TAPE | 12.65±0.025 | 16.0~18.0 | 18 | — | 0.036 |
| DOUBLE-LENGTH METAL TAPE | 12.65±0.025 | — | 9 | — | 0.0045 |

Fig. 11A

ROLLER HEIGHT 12.50mm

| SPRING PRESSURE | TAPE TENSION 200(gf) | 140(gf) |
|---|---|---|
| 25(gf) | X | X |
| 50(gf) | X | X |
| 70(gf) | X | X |

Fig. 11B

ROLLER HEIGHT 12.61mm

| SPRING PRESSURE | TAPE FEEDING | | | TAPE REWINDING | | |
|---|---|---|---|---|---|---|
| | GUIDE 50b | GUIDE 50a | GUIDE 54 | GUIDE 50b | GUIDE 50a | GUIDE 54 |
| 20(gf) | O | O | O | O | O | O |
| 25(gf) | O | O | O | O | O | O |
| 34(gf) | O | O | O | O | O | X |
| 42(gf) | O | O | X | X | X | X |
| 55(gf) | X | X | X | X | X | X |

MAGNETIC TAPE APPARATUS

BACKGROUND OF THE INVENTION

1. Field of the Invention

The present invention relates to a magnetic tape apparatus, and more specifically, to a magnetic tape apparatus that receives a magnetic tape cartridge and is suitable for driving a relatively thin metal tape.

2. Background Information

A magnetic tape apparatus uses a magnetic tape cartridge to store data, and uses a loader to load and hold the tape cartridge. The magnetic tape is wound around a file reel provided within the tape cartridge. Once the tape cartridge is loaded into the apparatus, the magnetic tape apparatus can write data to the magnetic tape or read data from the magnetic tape by using a magnetic tape head. To position the magnetic tape for reading or writing, the magnetic tape is guided into a tape path defined by a plurality of tape guides and can be threaded to a machine reel in the magnetic tape apparatus by a threader that attaches to an end of the magnetic tape. In addition, the magnetic tape apparatus has a tape cleaner for removing unwanted material, such as dust, that adheres to the surface of the magnetic tape.

The data storage industry demands increased storage capacity on a magnetic tape. Increasing the size of the cartridge, however, is not feasible because the size of the tape cartridge is set as a standard that is almost impossible to change. Various improvements and modifications have been attempted to improve the magnetic tape apparatus and magnetic medium in order to improve the recording density. One of these improvements includes the use of a cartridge with a longer magnetic tape. This can be done by making the magnetic tape thinner so more tape can fit on a file reel.

Using thin magnetic tape, however, substantially reduces rigidity of the magnetic tape. A magnetic tape having lower rigidity frequently breaks down at an edge of the tape. The break down or damage of the magnetic tape may result in loss of the data recorded on that part of the magnetic tape. Thus, it is necessary that a magnetic tape apparatus be structured to prevent break down of the magnetic tape.

OBJECTS OF THE INVENTION

Accordingly, it is an object of the present invention to provide an improved magnetic tape apparatus that prevents breakdown of the magnetic tape.

More specifically, an object of the present invention is to provide an improved magnetic tape apparatus that prevents folding of a relatively thin magnetic tape.

Another object of the present invention is to provide an improved magnetic tape apparatus that maintains a certain vertical positional deviation for a track on part of the magnetic tape that is opposed to the magnetic head relative to the magnetic head, while preventing the folding of a top edge of the magnetic tape.

An additional object of the present invention is to provide an improved magnetic tape apparatus that can guide a magnetic tape along a path and that prevents folding of a top edge of the magnetic tape even near a machine reel, where the magnetic tape is susceptible to relatively large deflection along a width of the tape.

A further object of the present invention is to provide an improved magnetic tape apparatus that reduces folding of a top edge of the magnetic tape while reducing the thickness of the magnetic tape to about ½ the thickness of tape in the prior art.

Yet another object of the present invention is to provide an improved magnetic tape apparatus that prevents buckling of a double-length metal magnetic tape.

Yet an additional object of the present invention is to provide an improved magnetic tape apparatus that effectively removes dust that adheres to the surface of the magnetic tape before the dust can rest on the magnetic head.

These and other objects of the present invention are discussed or will be apparent from the detailed description of the invention.

SUMMARY OF THE INVENTION

In one aspect of the invention, a magnetic tape apparatus for reading data from and writing data to a magnetic tape has at least one first tape guide that maintains the magnetic tape along a tape path. In addition, the first tape guide has a portion that exerts a generally vertical pressing force against the magnetic tape when the magnetic tape moves out of the tape path in the direction of the portion, the portion first yields to accommodate the magnetic tape and then presses the magnetic tape back into the tape path. This pressing force exerted against the magnetic tape prevents folding of the magnetic tape.

In another aspect of the invention, the generally vertical pressing force is created by compression and expansion of a coil spring. The magnetic tape can be merely approximately 8 to 12 $\mu$m thick.

In yet another aspect of the invention, the first tape guide also has a first guide surface to guide the magnetic tape, and has a width that is narrower than the width of the magnetic tape.

Finally, in a further embodiment, a tape guide for guiding a magnetic tape in a magnetic tape apparatus has a base that has a fixed shaft with a bottom and a top, where the bottom is mounted to the base. In addition, a roller defines a guide surface for guiding a magnetic tape that is placed against the guide surface and is rotatably mounted on the shaft. A top flange is positioned at the top of the shaft and has a fixed flange part and a movable flange part; the fixed flange part is fixed to the top of the fixed shaft while the movable flange part is mounted on the shaft so that the movable flange part slides axially along the shaft. A coil spring is also used in this embodiment and is positioned between the movable flange part and the fixed flange part, for biasing the movable flange toward the roller. The movable flange presses against an edge of the magnetic tape positioned along the guide surface, to prevent folding of the magnetic tape.

BRIEF DESCRIPTION OF THE DRAWINGS

The above mentioned and other features of this invention and the manner of obtaining them will become more apparent, and the invention itself will be best understood, by reference to the following description of the preferred embodiment of the invention in conjunction with the drawings, in which:

FIG. 7 is a table listing characteristics for types and sizes of magnetic tape;

FIG. 11A is a table showing the relationship between a tape pressing force and tape tension;

FIG. 11B is a table showing the relationship between a tape pressing force and the tape guides;

DESCRIPTION OF THE PREFERRED EMBODIMENT

Figure 1:
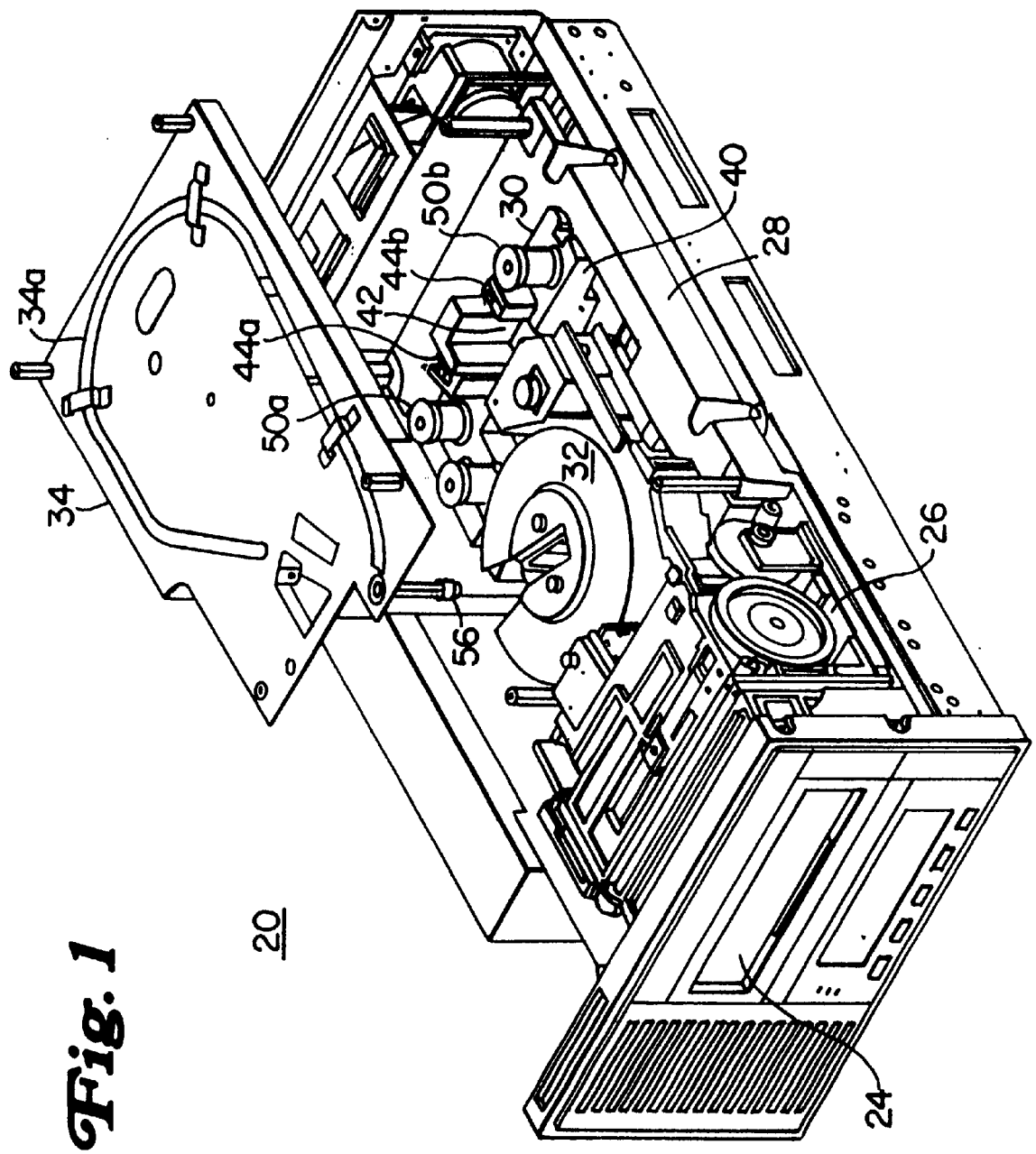
FIG. 1 is an isometric view of the partially assembled internal components of a magnetic tape apparatus of the present invention.

FIG. 1 is a perspective view of the internal structure of a magnetic tape apparatus 20 of the present invention that uses a magnetic tape cartridge such as an I3590 cartridge. A tape cartridge 22 (illustrated in FIG. 2) is received and ejected through an entry/exit port 24 provided at the front surface of the magnetic tape apparatus. Upon entering the port 24, the tape cartridge 22 is loaded to a predetermined position by a loader 26 provided on an apparatus base 28. In addition, a sub-assembly 30, a machine reel 32, a drive motor (not illustrated) for driving the machine reel 32, and a threader 34, are provided on the apparatus base 28.

Figure 2:
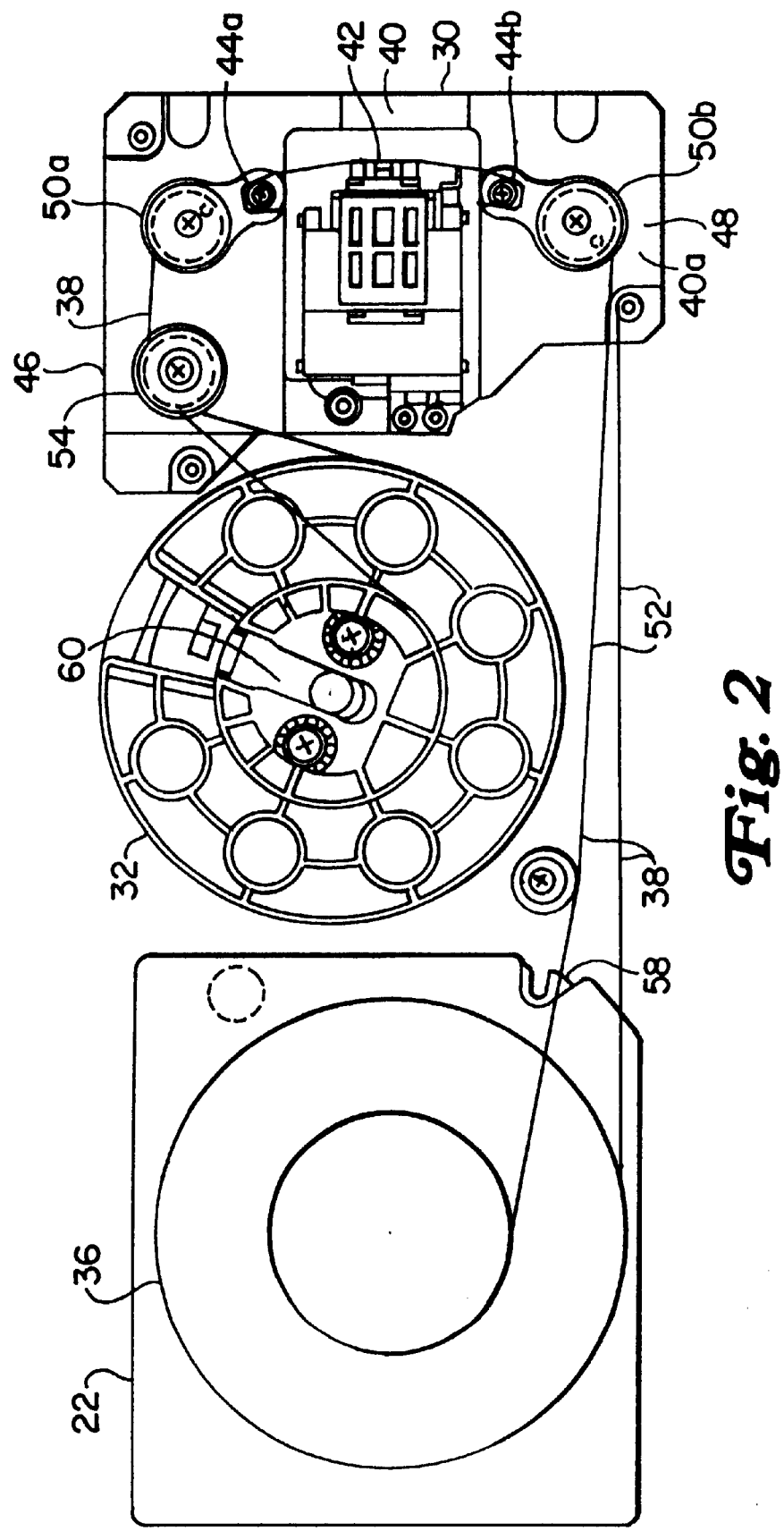
FIG. 2 is a fragmentary plan view showing the tape path in the magnetic tape apparatus of the present invention.

The loader 26 is provided near a front side of the magnetic tape apparatus 20 and receives and holds the tape cartridge 22. Moreover, the loader 26 has a drive motor to drive a file reel 36 provided within the tape cartridge 22 (as seen in FIG. 2). Magnetic tape 38 is wound around the file reel 36. The machine reel 32 takes up the magnetic tape 38 brought from the cartridge 22 and is positioned between the loader 26 and the sub-assembly 30. The motor (not illustrated) for driving the machine reel 32 is arranged below the machine reel.

The sub-assembly 30 has a base 40. As best seen in FIG. 2, a magnetic tape head 42 for writing and reading data to and from the magnetic tape is arranged on the base 40. The head 42 divides the magnetic tape apparatus into two areas. Thus, for clarity in explaining the embodiment, the area from the machine reel 32 to the head 42 is designated an upstream side and the area from the head 42 to the file reel 36 is designated a downstream side relative to a path created for the magnetic tape 38, as explained below.

Tape cleaners 44a, 44b are provided on both sides of the head 42 to remove dust that adheres to the surface of the magnetic tape. The tape cleaner 44a is provided in the upstream side 46 of the magnetic head 42. The tape cleaner 44b is provided on the downstream side 48 of the head 42. The tape cleaner 44b is provided between an adjustable tape guide 50b and the head 42, and the tape cleaner 44a is positioned between an adjustable tape guide 50a and the head 42. Another nonadjustable tape guide 54 is also located upstream of the adjustable tape guide 50a These adjustable tape guides 50a, 50b and 54 form a tape path 52 for the magnetic tape 38 as shown in FIG. 2. The adjustable tape guides 50a, 50b restrict the position of the magnetic tape 38, and therefore the tape path 52, in the width direction of the magnetic tape (hereinafter called the vertical direction) by guiding the surface of the tape so that the tape moves in a path adequate for reliable reading and writing.

FIG. 2 also shows a range of paths for tape path 52. One line represents the tape path 52 when the file reel 36 in the cartridge 22 holds almost all of the tape, and another line represents the tape path 52 when the machine reel 32 holds almost all of the tape. The tape path 52 can be situated anywhere between the two lines.

The threader 34 is positioned to cover both the sub-assembly 30 and the machine reel 32. The threader 34 is also provided with a threader pin 56, a threader arm (not shown), and a motor (not shown) driving the threader arm. After the magnetic tape cartridge 22 is loaded into the magnetic tape apparatus by the loader 26, the threader pin 56 engages a leader block 58 (shown in FIG. 2) that is attached to the leading end of the tape 38. By moving along a guide groove 34a, the threader pin 56 pulls the front end of the magnetic tape to the machine reel 32. In addition, as the threader pin 56 moves along the guide groove 34a, the magnetic tape 38 is attached to the machine reel 32 after being placed in contact with the adjustable tape guide 50b, the tape cleaner 44b, the head 42, the tape cleaner 44a, the adjustable tape guide 50a, and the nonadjustable tape guide 54 that define the tape path 52. To attach the tape 38 to the machine reel 32, the leader block 58 is engaged with a leader block inserting port 60 on the machine reel 32. The threader pin 56 is then positioned at the rotational center of the machine reel 32. When the machine reel 32 rotates at a predetermined speed to wind up the magnetic tape 38, the head 42 reads the information recorded on the magnetic tape and/or writes information to the magnetic tape as the tape passes the head.

Rewinding is defined as occurring when the magnetic tape 38 is wound up on the file reel 36 in the cartridge 22 from the machine reel 32. While rewinding the magnetic tape 38, the magnetic tape head 42 can also read and write data from and to the magnetic tape. In addition, when the magnetic tape 38 is returned to the magnetic tape cartridge 22, the threader 34 operates in reverse order from the operation for positioning the magnetic tape along the tape path 52. In that case, the leader block 58 is carried by the threader 34 back to the cartridge 22 and the file reel 36 is rotated to wind up the magnetic tape 38.

Figure 3:
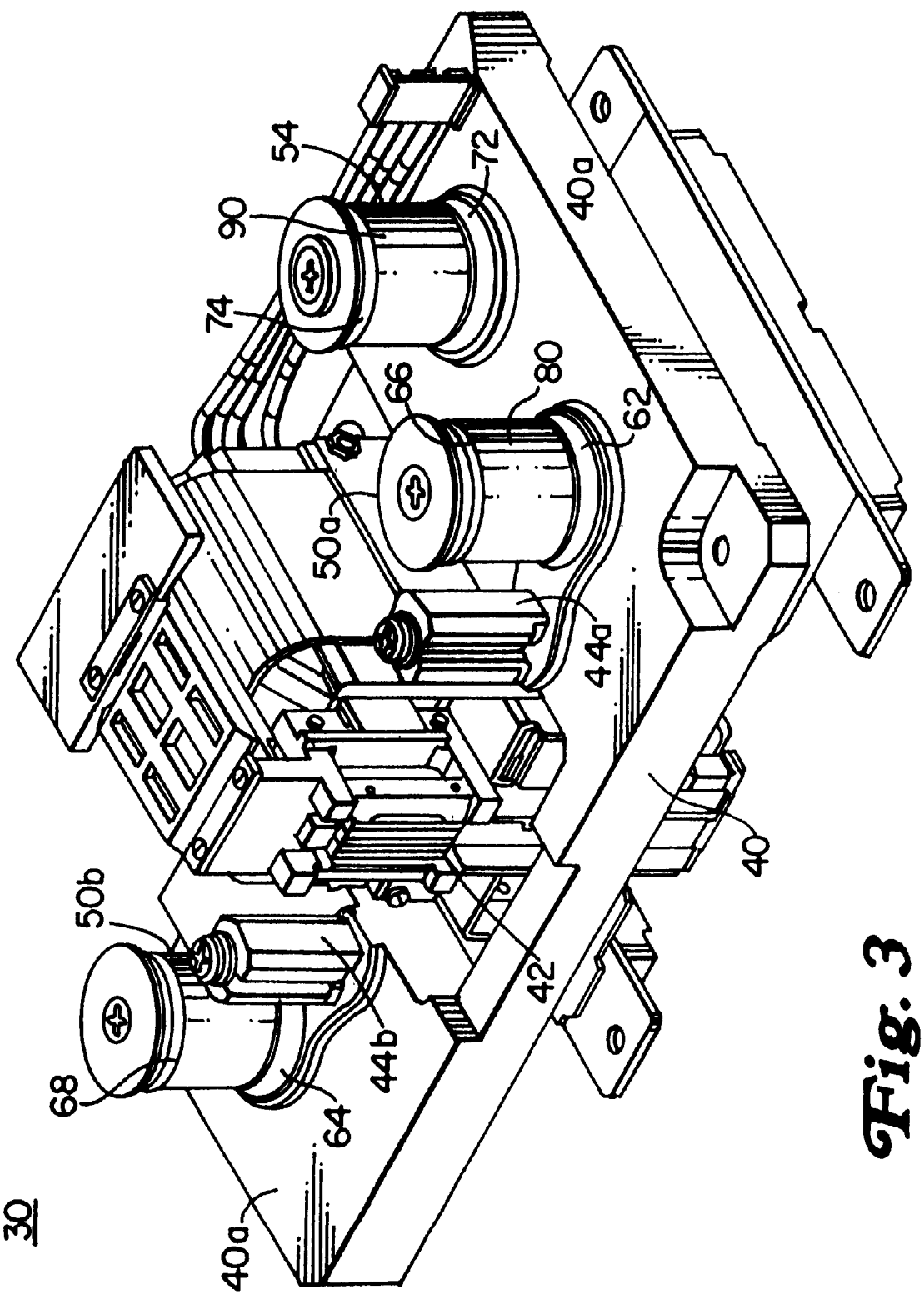
FIG. 3 is an isometric view of an assembled sub-assembly of the magnetic tape apparatus of FIG. 1.

FIG. 3 shows a structure of the sub-assembly 30. The magnetic head 42, the three adjustable tape guides 50a, 50b, 54, and two tape cleaners 44a, 44b are mounted on the sub-assembly base 40. The magnetic head 42 is mounted so that it can move perpendicularly (vertical) to a parts-mounting surface 40a of the base 40. The mechanism that moves the magnetic head 42 is not shown. In addition, in order to realize high density recording, it is preferred that the horizontal space between the core section and the tape surface be as small as possible. Thus, the optimal position for the tape path 52 is to be in contact with the head 42.

The head 42 is formed by stacking a plurality (usually, 18 to 72 pairs) of read/write cores vertically. Each core writes information to a portion of the magnetic tape 38 opposed to each core and reads information from such portion. A belt of data written by a plurality of the cores that is formed along the magnetic tape 38 is called a track.

In order to accurately read the data written on the tape 38, each core must be positioned in front of the same portion of track on the tape 38. The vertical position of the magnetic tape 38 is controlled by the adjustable tape guides 50a, 50b so that the vertical position of the magnetic tape in front of the head 42 is always substantially the same. The adjustable tape guides 50a, 50b also control the tape path 52 so that the magnetic tape 38 is placed in contact with the head 42 and tape cleaners 44a, 44b while keeping an adequate vertical (or tape width direction) position for tracks on the tape.

As shown in FIG. 3, the adjustable tape guide 50a has a stationary flange 62 for guiding a bottom edge 38c (shown in FIG. 6) of the magnetic tape 38 and a movable flange 66 for guiding a top edge 38b (shown in FIG. 6) of the magnetic tape. Similarly, adjustable tape guide 50b has a stationary flange 64 for guiding the bottom edge 38c of the magnetic tape 38 and a movable flange 68 for guiding the top edge 33b of the magnetic tape 38.

Figure 4:
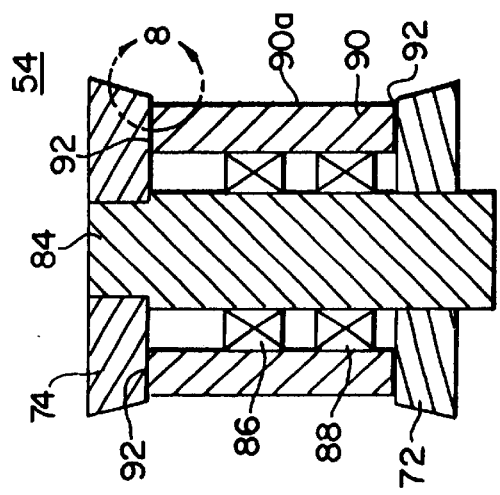
FIG. 4 is a cross section of an adjustable tape guide in the present invention.

FIG. 4 is a cross-sectional view showing the structure of the adjustable tape guide 50a. The structure is similar for the adjustable tape guide 50b. The adjustable tape guide 50a is provided with a stationary shaft 76. The stationary shaft 76 is fixed to the sub-assembly base 40. Two bearings 78a, 78b rotatably support a cylindrical, rotational shaft placed around the stationary shaft 76 called a roller 80. The lower flange 62 is fixed at the lower side of the stationary shaft 76. A narrow gap 82 is formed between the lower flange 62 and the roller 80. The gap 82 is so narrow that magnetic tape 38 cannot slip into the gap.

The external or circumferential surface 80a of the roller 80 is a guide surface that guides the flat surface of the magnetic tape 38. Thus, the surface 80a guides the magnetic tape 38 by being in contact with the recording surface of the magnetic tape 38. In addition, the roller 80 rotates when the magnetic tape 38 runs along the roller 80 due to a friction force between the magnetic tape 38 and the roller 80. Thus, the velocity of the surface 80a equals the speed of the magnetic tape 38 running along the adjustable tape guides 50a and 50b.

The upper flange 66 is provided on the upper end of the stationary shaft 76 and has a movable section 66a, a stationary section 66b, and a coil spring 70. The stationary section 66b is fixed to a small diameter section 76a of the stationary shaft 76. The movable section 66a is fitted onto the small diameter section 76a so that it can move in the vertical (axial) direction along the small diameter section 76a. The coil spring 70 presses the movable section 66a toward a stepped section 76b of the stationary shaft 76. The movable section 66a can move in the vertical direction using the small diameter section 66a as a guide. The movable section 66a is pushed toward the stepped section 76b by receiving a pressing force from the coil spring 70. Other types of springs or devices that could bias a flange toward an edge of the magnetic tape are contemplated.

The force of the coil spring 70 used to press the movable section 66a is the same force used to press the magnetic tape 38 toward the lower flange 62. In other words, in the adjustable tape guides 50a and 50b, the upper flange 66 pushes the magnetic tape 38 toward the lower side stationary flange 62, and the upper flange 68 also presses a bottom edge 38c of the magnetic tape 38 against the lower side stationary flange 62. This is true even if the tape width of the magnetic tape 38 fluctuates.

The pressing force of the spring 70 accurately maintains the vertical position of the tape 38 by restricting a positional deflection of each track on the magnetic tape 38, relative to the position of the head's cores, within an allowable parameter or value. The amount of pressing force used in the present invention is sufficient to eliminate deflection of the tape position even when an external force impacts the tape 38 under normal operating conditions.

The pushing force of the coil spring 70 is preferably set to 20 gf to 25 gf when a double-length metal magnetic tape is used as the magnetic tape 38. If the force of the coil spring 70 is too strong, an edge of the magnetic tape 38 can be folded or shaved, resulting in breakdown of the magnetic tape 38. Meanwhile, if the force is too weak, the magnetic tape 38 will not be pressed toward the lower flange 62, and the magnetic tape 38 will not be correctly positioned for accurate reading/writing resulting in unevenness on either of the reels in the vertical direction (or width dimension) when winding the magnetic tape 38 around the reels. This unevenness while winding also can cause folding of the edge of the magnetic tape 38.

Also in the preferred embodiment, the vertical or height dimension of the roller 80 is approximately 12.61 mm±0.015 mm when the width of the magnetic tape is 12.65 mm±0.025 mm. Thus, the roller 80 is narrower than the width of the magnetic tape 38 so that the magnetic tape 38 extends above the roller 80 by a length of approximately 0.04 mm. Applicants contemplate that the present tape guides will operate with rollers of other widths as long as the difference between tape and tape guide widths is maintained.

Figure 5:
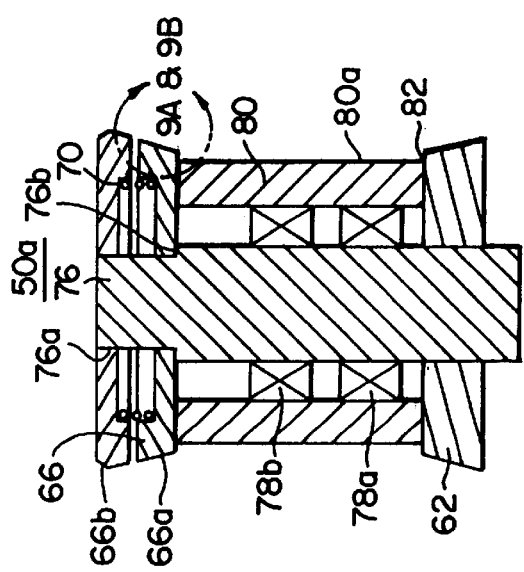
FIG. 5 is a cross section of a nonadjustable tape guide in the present invention.

FIG. 5 is a cross-section that shows the structure of the nonadjustable tape guide 54. Some of the parts of the nonadjustable tape guide 54 are similar to the parts of the adjustable tape guides 50a and 50b. For instance, the non-adjustable tape guide 54 is also provided with a stationary shaft 84 fixed to the sub-assembly base 40. In addition, a couple of bearings 86, 88 support a roller 90 which has an external or circumferential surface 90a that guides the flat recording surface of the magnetic tape 38.

The lower flange 72 is fixed on the lower side of the stationary shaft 84. The upper flange 74 is fixed to the upper side of the stationary shaft 50. A narrow gap 92 is formed between each flange (72 and 74) and the roller 90 is narrow enough to prevent the magnetic tape 38 from entering the gap.

The width of the roller 90 in the vertical or height direction is wider than the maximum width of the magnetic tape 38. The magnetic tape 38 is guided so that the entire surface of the magnetic tape 38 in the width direction is in contact with the guide surface 90a of the roller 54. Thus, the nonadjustable tape guide 54 does not create any free floating edge or portion of the magnetic tape 38 that is not supported by the guide surface 90a, in contrast to the adjustable tape guides 50a and 50b. To accomplish this, the width in the vertical or height direction of the guide surface 90a is 0 mm to 0.1 mm larger than a maximum width of the magnetic tape 38, taking fluctuation of the width of the magnetic tape into account. Since the preferred maximum width of the magnetic tape 38 is approximately 12.675 mm, the length of the guide surface 90a ranges from approximately 12.675 mm to 12.775 mm. Of course, applicants understand the rollers could operate with other total widths where the difference in widths is maintained.

The roller 90 is also rotated due to the friction force generated between the magnetic tape 38 and the roller 90, and therefore, the velocity of the surface 90a is the same as the speed of the magnetic tape 38.

The stationary shafts 76 and 84 are formed using a stainless material with excellent qualities for manufacturing the shafts. These stationary shafts can be integrally formed, at their lower part, with annular projections (not shown) for attaching the shafts to a base. The lower flanges 62 and 72 are formed using a ceramic material and engage the stationary shafts 76, 84 so that the flanges can move vertically along the stationary shafts. The lower flanges 62, 72 are placed in contact with a lower surface of the annular projection (also not shown) to hold the lower flanges in place.

In the preferred embodiment, the nonadjustable tape guide 54 is situated between the machine reel 32 and the adjustable tape guide 50a on the upstream side. Depending on the amount of magnetic tape 38 wound around the machine reel 32, a winding radius of the magnetic tape 38 varies on the machine reel 32. As the tape winding radius varies, the tangential direction in which the magnetic tape 38 leaves the machine reel 32, and therefore, the angle in which it enters the sub-assembly 30 at the adjustable tape guides 50a, 50b or 54, changes. This change of angle appears as a change of the force applied on the tape guide by the tape. This can cause a positional deflection of the tape 38 near the head 42.

The nonadjustable tape guide 54 is provided to absorb changes in force due to a change of the winding radius of the magnetic tape 38 on the machine reel 32, and stabilizes the magnetic tape 38 as it moves toward the adjustable tape guide 50a. In the tape path 52 shown in FIG. 2, since the distance between the file reel 36 and the adjustable tape guide 50b is longer than the distance between the machine reel 32 and the adjustable tape guide 50a, the change of the tape winding angle for the adjustable tape guide 50a is larger than the angle for the adjustable tape guide 50b. Thus, the nonadjustable tape guide 54 is placed along the shorter distance to lower the impact of forces from the larger angle on the adjustable tape guide 50a.

Of course, Applicants contemplate the structure where the distance between the machine reel 32 and the adjustable tape guide 50a is longer than the distance between the file reel 36 and the adjustable tape guide 50b, so that the change of tape winding angle for the adjustable tape guide 50b is larger than the angle for the adjustable tape guide 50a. In that case, the nonadjustable tape guide 54 would be arranged in the downstream side 48 near the adjustable tape guide 50b.

Applicants also contemplate that many positions for the tape guides could be used to define an adequate tape path 52 as long as at least one stationary nonadjustable tape guide and at least one adjustable tape guide 50a or 50b is used.

Figure 6:
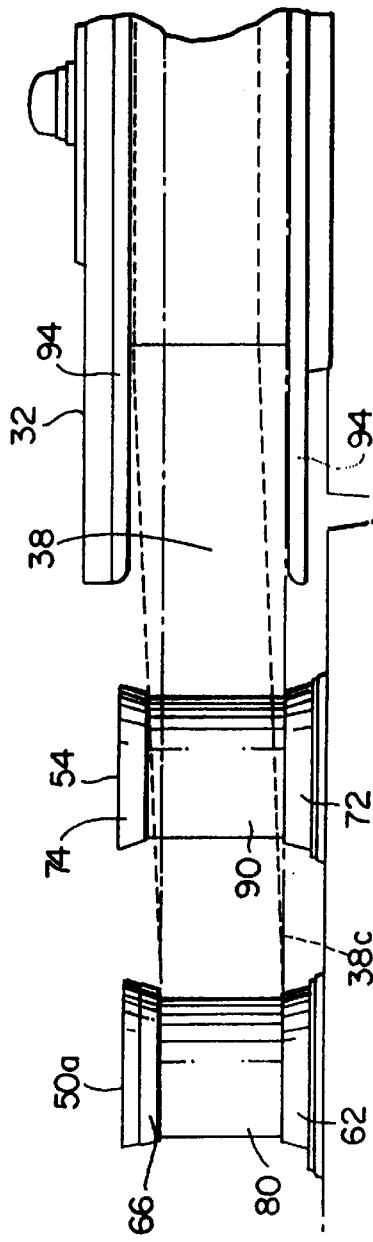
FIG. 6 is a fragmentary side elevation view of the tape path on a portion of the present magnetic tape apparatus.

FIG. 6 depicts the upstream side 46 of the magnetic tape 38. The magnetic tape 38 extends from the adjustable tape guide 50a, around the nonadjustable tape guide 54 and onto the machine reel 32 along the tape path 52. The adjustable tape guide 50a controls the vertical position of the magnetic tape 38 with high accuracy by using the upper flange 66 to press the magnetic tape 38 toward the lower flange 62 of the adjustable tape guide 50a, which also presses the magnetic tape 38 toward the lower flange 72 of the nonadjustable tape guide 54.

Three aspects of the machine reel 32 also cause changes in the vertical position of the magnetic tape 38. First, as the drive motor (not shown) rotates the machine reel 32, mechanical vibrations are generated. Second, the machine reel 32 may also have parts that are built within wide tolerances due to manufacturing errors or errors during assembly of the machine reel 32. Third, when the magnetic tape 38 is winding on the machine reel 32, air accumulates in the space between a portion of the magnetic tape 38 already wound on the machine reel 32 and a portion of the tape about to enter or exit the machine reel. As air escapes from this space, pressure is applied to the magnetic tape 38.

As shown in FIG. 6, the magnetic tape 38 becomes displaced within a range defined between the dashed lines and the broken lines representing the positions of the magnetic tape 38. Note that the actual change in vertical angle of the magnetic tape 38 in FIG. 6 is exaggerated for clarity and the positions of the tape 38 are not drawn to scale.

The nonadjustable tape guide 54 is also used to reduce vertical displacement of the tape position, between the machine reel 32 and adjustable tape guide 50a. A friction force generated between the nonadjustable tape guide and the magnetic tape 38 prevents further vertical (or width direction) movement of the magnetic tape 38. Finally, to prevent even further unevenness on the machine reel 32, the space between both flanges 94 of the machine reel 32 is preferably shortened to 13.2 mm.

FIG. 7 is a table showing dimensions and mechanical characteristics of various magnetic tapes. A magnetic tape used in a magnetic tape cartridge is generally manufactured by coating chromium oxide with a binder on a base material and is 28 $\mu$m thick. A double-length chromium tape with a thinned base material and a metal tape of usual length but with a coating of magnetic metal powder (metal) in place of chromium oxide have thicknesses of 18 $\mu$m.

A magnetic tape 38 used in the present invention is a double-length metal tape with the same width of 12.65 mm as the other types of tape. The base material, however, is thinned even further than the usual double-length metal tape. Magnetic tape 38 has a thickness of 8 $\mu$m to 12 $\mu$m, and is preferably 9 $\mu$m thick. Thus, the thickness of the double-length metal tape is about ½ of the thickness of the known metal tape or known double-length chromium tape. The buckling rigidity of the double-length metal tape used in the present invention is 0.0045 N·mm$^2$, which is about ⅛ of the buckling rigidity of the ordinary metal tape and the double-length chromium tape. Since the rigidity of the magnetic tape 38 is extremely small, the edges of the double-length metal tape fold easily.

As shown in FIG. 6, even if the magnetic tape 38 is extremely thin and vertically displaced on the nonadjustable tape guide 54, the magnetic tape 38 never deviates off of the roller 90 on the nonadjustable tape guide 54. The entire surface of the magnetic tape 38 always remains supported by, and in contact with, the surface 90a of the roller 90. When the magnetic tape 38 deviates vertically, between the machine reel 32 and the adjustable tape guide 50a, a top edge 38b that is part of a top edge section 38a of the magnetic tape 38 comes in contact with the upper flange 74 and is stopped from moving upward any farther. In that case, as long as the entire width of the magnetic tape 38 is pressed against the roller 90 by tension in the tape, a configuration that imitates high rigidity in the magnetic tape 38 results and the top edge 38b of the magnetic tape 38 will not fold easily.

Figure 8:
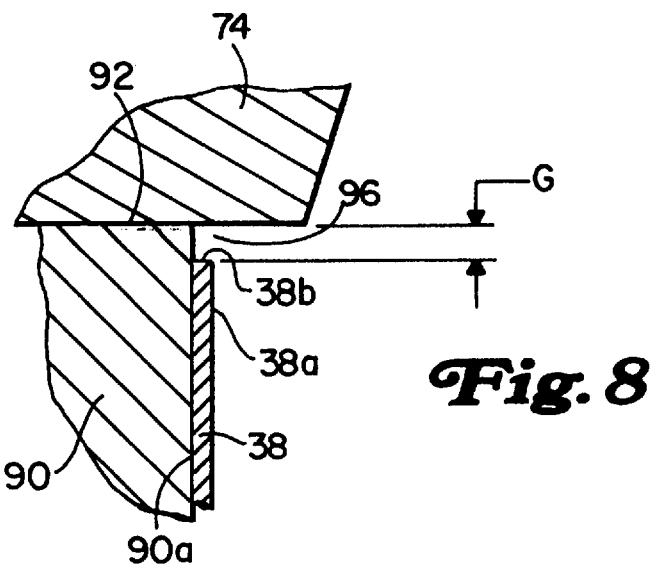
FIG. 8 is an enlarged fragmentary sectional view of the area circled in FIG. 5.

FIG. 8 is an enlarged view of the circled region of the nonadjustable tape guide 54 in FIG. 5. As shown in FIG. 8, the entire surface of the magnetic tape 38 in the vertical direction is guided by the guide surface 90a. The top edge section 38a of the magnetic tape 38 is not projecting beyond the guide surface 90a. Furthermore, the top edge 38b of the magnetic tape 38 is not in contact with the upper flange 74. Typically, a gap 96 of width G forms between the upper flange 74 and the top edge 38b where G is approximately in the range of 0 mm to 0.1 mm. When G falls in or near this range, folding of the top edge section 38a will not occur and unevenness from winding the magnetic tape 38 on the machine reel 32 is also reduced. With these properties, even when the thinned double-length metal magnetic tape 38 is used, the use of the nonadjustable tape guide 54 allows for positioning of the machine reel 32 in proximity to the head 42.

In addition, the upper flange 74 of the nonadjustable tape guide 54 is provided as extra protection to further alleviate vertical displacement of the magnetic tape 38. In fact, if manufacturing errors and assembly errors of the machine reel 32 are reduced to further sufficiently reduce vertical deflection of the magnetic tape 38, it is comprehended that the nonadjustable tape guide 54 can be provided without the upper and lower flanges 74, 72.

Note that if the nonadjustable tape guide 54 is provided with a movable flange without a biasing device, as in the adjustable tape guide, folding of the magnetic tape 38 would still occur. If the top edge section 38a of the double-length metal magnetic tape 38 projects beyond the guide surface 90a of the roller 90 over a gap created between the roller 90 and flange 74, the top edge section 34a is no longer supported by the guide surface 90a. In this situation, the magnetic tape, which is vibrating extensively in the vertical direction at the position of the nonadjustable tape guide, will buckle at its top edge section 38a without a force to urge the double-length metal tape 38 back down toward the lower flange 72.

However, as designed, the nonadjustable tape guide 54 still reduces vertical movement of the magnetic tape 38 since the roller 90 is in contact with the entire width of the magnetic tape 38. In other words, even though the nonadjustable tape guide 54 cannot, on its own, completely restrict the vertical deviation of the magnetic tape 38 lower than an allowable or preferred value for deviation of vertical position of the tape 38, the nonadjustable tape guide can still lower the amount of deviation within a range that is close to the allowable or preferred value. Thus, since the nonadjustable tape guide 54 already reduces the amount of vertical deviation, the adjustable tape guides 50a and 50b will further reduce the vertical deviation to the allowable or preferred range.

Figure 9A:
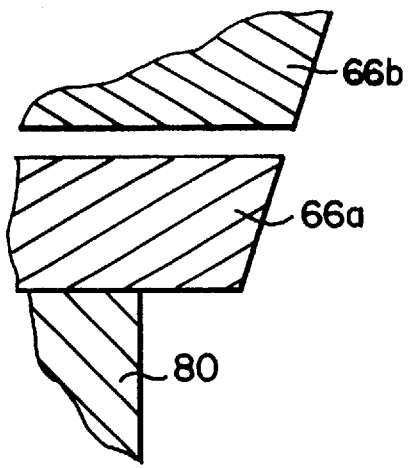
FIG. 9A is an enlarged fragmentary sectional view of the circled area in FIG. 4 without a magnetic tape.
Figure 9B:
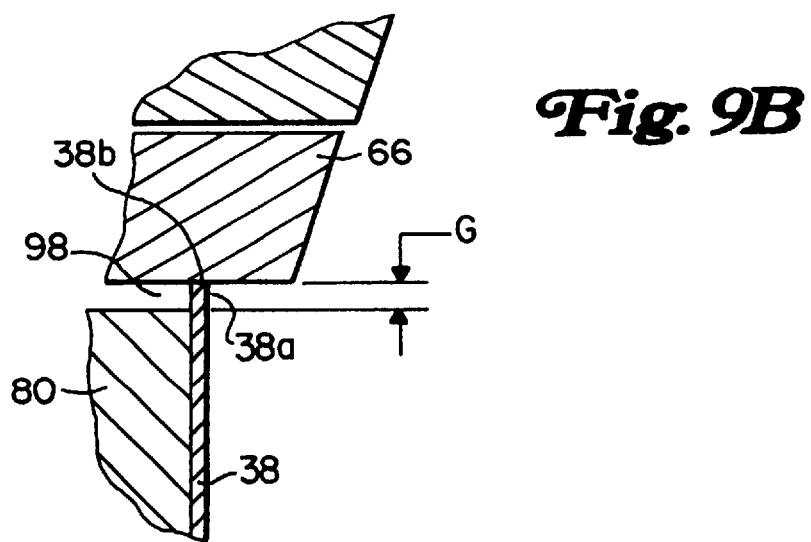
FIG. 9B is an enlarged fragmentary sectional view of a magnetic tape placed on the adjustable tape guide shown in the circled area in FIG. 4.

FIGS. 9A and 9B are enlarged views of the circled region in FIG. 4 and show structural details of the adjustable tape guide 50a. Adjustable tape guide 50b has a similar structure. FIG. 9A shows the adjustable tape guide 50a without the magnetic tape 38 and FIG. 9B shows the adjustable tape guide 50a with the magnetic tape 38. As depicted in FIG. 9A, if the magnetic tape 38 is not in contact with the adjustable tape guide 50a, the movable section 66a is urged downward toward the roller 80 so that the gap 98 between the movable section 66a of the upper flange 66 and the roller 80 is almost completely closed.

When the magnetic tape 38 is first pulled onto the adjustable tape guide 50a, the movable section 66a of the upper flange 66, as shown in FIG. 9B, is initially pushed upward by the rigidity of the magnetic tape 38. At this time, gap 98 is relatively large, and the top edge section 38a extends over the gap 98 from the upper end of the roller 80 without any support at that section. Only the top edge 38b is in contact with the movable section 66a to restrict vertical movement of the tape 38. Folding of the magnetic tape 38 is then prevented by the coil spring 70 by applying the pressing force back down on the top edge 38b, even though the thinned double-length metal magnetic tape 38 has extremely low rigidity.

However, when a pressing force from the coil spring 70 in the adjustable tape guide 50a is applied to magnetic tape 38 through the movable section 66a, the downward movement of section 66a could cause the magnetic tape 38 to fold if the pressing force from the section 66a is too strong. As explained above, the thickness of the magnetic tape 38 is reduced to about half of the thickness of the ordinary magnetic tape. This reduces buckling rigidity of the magnetic tape 38 to ⅛ the buckling rigidity of the tapes in the prior art. In other words, if a pressing force used against the magnetic tape 38 exceeds ⅛ the pressing force used against the ordinary magnetic tape, folding of the tape is generated at the top edge section 38a of the magnetic tape.

Since buckling rigidity is inversely proportional to the square of the length of the top edge section 38a that is extending beyond the edge of a roller 80 and is not supported by the roller 80, when reducing this extension length, the buckling rigidity for the magnetic tape 38 will increase. The maximum length for an unsupported projection without buckling in the prior art is 0.19 $\mu$m (19 mm). By limiting the extension length (amount projected) of the top edge section 38a to half(10 mm or 0.10 $\mu$m) the length in the prior art, the buckling rigidity of the magnetic tape 38 increases up to four times the rigidity of the prior art tape. Thus, the current magnetic tape 38 realizes ½ the buckling rigidity of the prior art and not merely ⅛ the buckling rigidity of the prior art.

Thus, as long as the top edge section 38a of the magnetic tape 38 will only project beyond the roller 80 up to a maximum of 0.10 mm for a tape thickness of 9 $\mu$m, rigidity of the magnetic tape 38 itself still prevents folding of the top edge section 38a for such a small length of extension. Thus, the gap 98 preferably has a maximum width of approximately 0.10 mm or less. When the magnetic tape 38 has a thickness of 18 $\mu$m, the allowable amount of projection, and therefore gap width, is in a range approximately 0.11 to 0.19 mm.

When the magnetic tape 38 is at least 18 $\mu$m thick, the preferable height or vertical dimension of the roller 80 is 12.50 mm. When the magnetic tape 38 is the double-length metal magnetic tape 9 $\mu$m thick, the height or vertical dimension of the roller 80 is preferably approximately 12.61 mm±0.015 mm, while taking into account the manufacturing or assembly tolerances for the roller 80, movable section 66a of the upper flange 66, and lower flange 62. The preferred width of the magnetic tape 38 is approximately 12.65 mm±0.025 mm for any type of magnetic tape. The preferred amount of projection of the magnetic tape 38 extending beyond the edge of the roller 80 is approximately 0.04 mm±0.04 mm.

Figure 10:
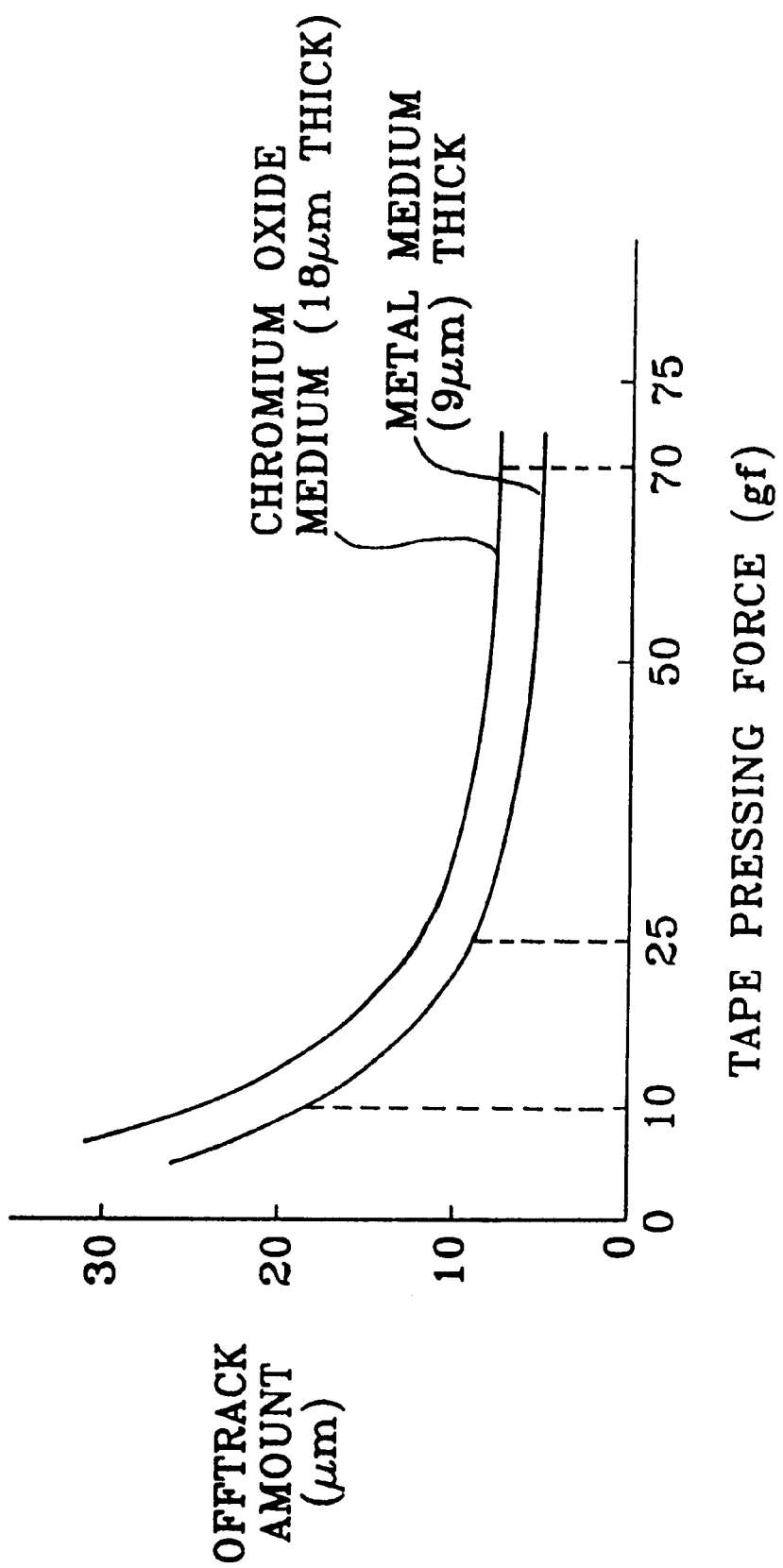
FIG. 10 is a graph showing the relationship between a tape pressing force and off-track amount.

FIG. 10 is a graph that shows the relationship between a tape pressing force and the amount of off-track (or length of extension off of a roller) the tape is restricted to by the pressing force. As explained above, if a pressing force applied to the magnetic tape 38 is restricted to about ⅛ (about 10 gf) the pressing force (about 70 gf) applied to an 18 $\mu$m tape, buckling of the top edge section 38a is prevented even if the length of the top edge section 38a projecting beyond the roller 80 is approximately 0.11 mm to 0.19 mm.

Also shown in FIG. 10, when a pressing force of 70 gf pushes against a chromium oxide tape 18 $\mu$m thick, the resulting amount of off-track (length of unsupported tape extending past the edge of a roller or out of the tape path) is less than 10 $\mu$m. However, where a pressing force of 10 gf pushes against a double-length metal magnetic tape 9 $\mu$m thick, the resulting amount of off-track is about 19 $\mu$m. As discussed above, a 9 μm thick magnetic tape will buckle when an off-track is more than 10 μm. Thus, a pressing force of 10 gf will not prevent buckling. It was found, however, that a pressing force of 25 gf will create an off-track of approximately 10 μm or less for the 9 μm thick tape. This pressing force (25 gf) is about ⅓ the pressing force (about 70 gf) that can be used for the 18 μm tapes.

FIGS. 11A and 11B are charts that show when folding of a 9 μm thick tape occurs. Circles "○" indicate no folding occurred and "X" indicates folding did occur. FIG. 11A shows results using a roller of 12.50 mm high (creating a projection of the tape of 0.15 mm) and FIG. 11B shows the results using a roller 12.61 mm high (creating a projection of the tape of 0.04 mm). As shown in FIG. 11A, a 12.50 mm roller height is too narrow. When the pressing force (spring pressure) is set to 25 gf, the tape still folds regardless of extremely high tape tension from 140 to 200 gf used to prevent the folds.

FIG. 11B is a chart showing the relationship between a pressing force and the three different adjustable tape guides 50a, 50b and 54 when the roller 80 has a height of 12.61 mm. Here, measurements were taken while winding the magnetic tape 38 around the machine reel 32 and during rewinding of the tape back onto the file reel 36.

As is apparent from FIG. 11B, where the pressing forces are 20 g and 25 g, the tape does not fold at the adjustable tape guides 50a, 50b and 54. Therefore, where the tape pressing force is set at 29 gf to 30 gf, and where the length of the projecting portion of the top edge section 38a is restricted to 0.10 mm maximum, the 9 μm thick magnetic tape 38 will not fold.

In another aspect of the present invention, metal can be used in the magnetic tape 38 to create magnetic characteristics suitable for high density recording. A surface of a metal tape, however, will deteriorate when an object slides along the tape. Thus, when the head 42 or adjustable tape guides 50b, 50a, 54 slide along a magnetic tape 38 made of metal, the collisions with the surface of the magnetic tape 38 will scrape particles off of the magnetic tape and create dust. This dust can interfere with reading and writing if the dust settles on the head 42.

While the tape is running through the tape path 52, as explained above, surfaces 80a and 90a of the rollers 80, 90 rotate at the same speed as the magnetic tape 38, which prevents the tape from sliding against the tape guides 50a, 50b and 54 while the tape is moving or running. When the magnetic tape 38 first starts to move or comes to a stop, however, sliding can occur. This happens if the activation torque (driving torque) of the rollers 80, 90 is smaller than the sum of the inertial force (driving force) of the rollers 80, 90 and the friction load. This means the rotating acceleration of the rollers cannot match the rotating acceleration of the magnetic tape 38.

In addition, the friction coefficient of the metal tape is reduced to half of the friction coefficient of magnetic tape with chromium oxide coatings. The friction coefficient of the chromium oxide coating magnetic tape is about 0.4. The metal tape disclosed here has a coating of pure iron powder with a friction coefficient of about 0.2. This reduction of the friction coefficient tends to generate easier slipping between the magnetic tape and the roller.

Furthermore, since the magnetic tape 38 is extremely thin, the tape tension applied to the magnetic tape is half of the tension applied to prior art tapes to prevent damage. Thus, roller driving torque, which controls the tape tension, must be reduced by half of that used in the prior art, which further permits slipping between the roller and the magnetic tape.

When the tape tension is reduced by half of the tension used in the prior art, this results in a driving force of the roller that is reduced to about ¼ of the driving force required in the prior art. However, with this ¼ reduction in driving force, the difference between the acceleration of the roller and the acceleration of the magnetic tape is too great and the tape will exhibit substantial slipping. Thus, a thinned cylindrical roller is used that produces an inertial (driving) force of the roller that is merely a ½ reduction from the driving force exhibited in the prior art rollers. While this will reduce some of the slipping, it cannot eliminate all of it. Thus, activation driving load torque of the rollers 80, 90 of the adjustable tape guides 50a, 50b and 54 must be reduced.

Figure 12:
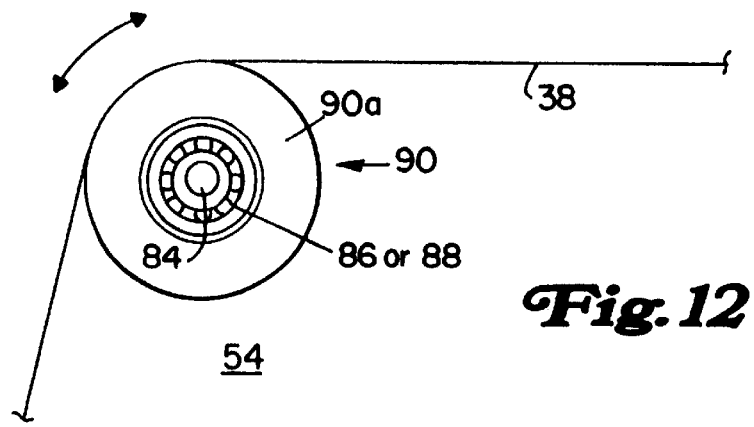
FIG. 12 is a cross-section of a nonadjustable tape guide.

In another aspect of the present invention, using oil or air bearings, rather than grease bearings, can also reduce slipping of the tape by permitting a reduction in the driving torque. FIG. 12 is a cross-sectional view of the nonadjustable tape guide 54. As shown, the surface 90a of the roller 90 is in contact with, and guides, the recording surface of the magnetic tape 38. The roller 90 is rotatably supported about the stationary shaft 84 through a couple of bearings 86, 88. These bearings 86, 88 are oil lubricated ball bearings.

The drive torque of each of the rollers can be reduced because an oil lubricant is used on the bearings 86, 88 that support the rollers, rather than a grease based lubricant. Grease contains a relatively large amount of filler in comparison to the amount in the oil, which has little or no filler. Filler is formed of solid particles that gives grease lubricant material higher viscosity. Although the high viscosity in the grease lubricated ball bearings keeps the balls greased for a long period of time, in order for the bearing to start operating, the balls must overcome the adhesive force of the higher viscosity grease. This causes high drive load torque of 2 gcm or higher for grease lubricated ball bearings with a viscosity of 53 CST (centi strokes).

Since oil has very little or no filler, it has low viscosity, and therefore, drive torque can be reduced by about half. Oil with a comparatively low viscosity of 30 CST is used as a lubricant for the ball bearings. The oil lubricated ball bearing has a drive load torque of 1 gcm or less. When oil viscosity reaches as high as 37 CST, it is no longer possible to obtain a drive load torque of 1 gcm or less. However, when oil viscosity is 20 CST or less, lubrication will not last the operational life required for a tape guide. In that case, drive torque is reduced by using air bearings instead. When the drive load torque of a roller is reduced, sliding between the thin magnetic tape and roller can be reduced. Reducing the amount of sliding allows for the use of a thin magnetic tape without creating dust.

Figure 13:
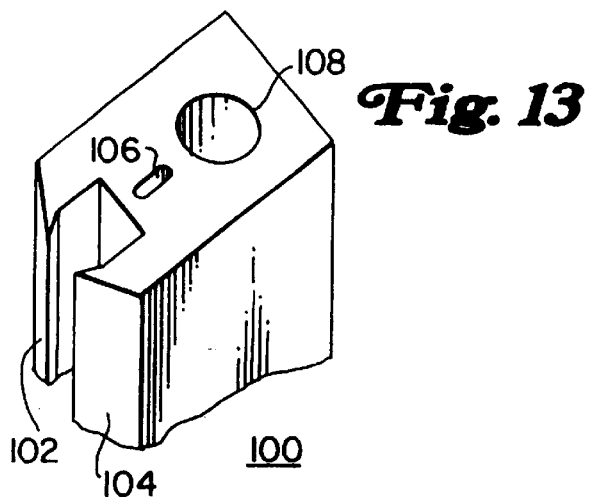
FIG. 13 is an isometric view of a first tape cleaner used in the present invention.
Figure 14:
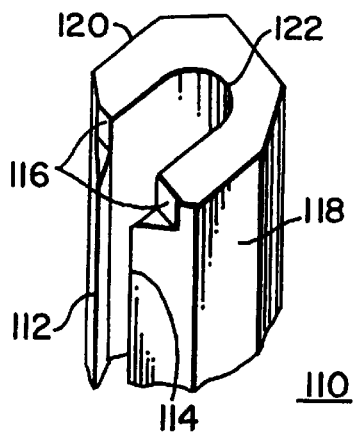
FIG. 14 is an isometric view of a second tape cleaner used in the present invention.

To further prevent dust from interfering with the reading and/or writing by the magnetic head 42, tape cleaners 44a, 44b are provided to remove dust that adheres to the magnetic tape 38. FIG. 13 is an isometric view of a first tape cleaner 44a. FIG. 14 is an isometric view of a second tape cleaner 44b. It is preferred that the tape cleaners 44a and 44b are arranged on each side of the head 42, as shown in FIG. 2.

That space between the head 42 and each adjustable tape guide 50a or 50b, however, must be as small as possible so that the distance from the head 42 to each adjustable tape guide 50a or 50b is as short as possible. This distance must remain short for the tape guides to adequately maintain the magnetic tape 38 at the required predetermined vertical position or range, as discussed above. This configuration, therefore, requires very small tape cleaners to fit into the small space on each side of the head 42 (see FIGS. 2 and 3).

The tape cleaner 100 as shown in FIG. 13 is provided with two cleaner blades 102, 104, a positioning slot 106 and a through hole 108. The tape cleaner 100 may be used as the tape cleaner 44b shown in FIGS. 1 to 3. A positioning pin (not shown) is mounted on the sub-assembly base 40 and the tape cleaner 100 is mounted on the positioning pin by inserting the positioning pin into a positioning slot 106. The tape cleaner 100 is then moved along the positioning slot 106 until it is placed in the proper position. Next, the tape cleaner 100 is fixed to the sub-assembly base 40 with a screw (similar to the screws shown in FIGS. 2, 3 and 15) placed in the through-hole 108. The tape cleaner 100, and consequentially the space required to fit the tape cleaner on the base 40, is relatively wider to accommodate the slot 106.

The tape cleaner 110 shown in FIG. 14 is provided with two cleaner blades 112, 114, three surfaces 116, 118, 120, and a hole 122 that receives a screw for mounting on the base 40. The first surface 116 and the second surface 118 are arranged at almost right angles relative to each other. In place of the second surface 118, the third surface 120 may also be used. The cleaner blades 112 and 114 are specially designed to slide against the magnetic tape 38 to remove dust without creating more dust themselves. The first surface is preferably set back from the ends of the cleaner blades 112 and 114, but also face the tape path 52 as do the blades. The tape cleaner 110 may be used as the tape cleaners 44a and/or 44b shown in FIGS. 1 to 3.

In yet a further aspect of the present invention, to further assure the head 42 writes and reads data properly, the tape cleaners 44a, 44b must be positioned with high accuracy relative to the position of the head 42. To accomplish this fine adjustment of the positioning of the tape cleaners, a mechanism was created to fit onto the sub-assembly 30.

Figure 15:
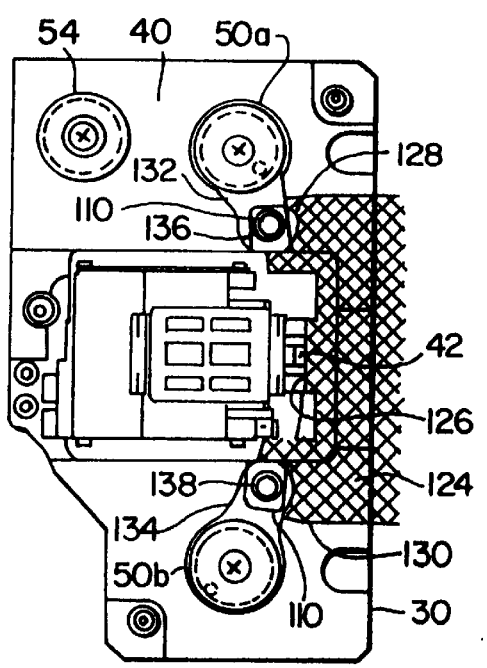
FIG. 15 is a top view of an assembled sub-assembly and jig used in the present invention.

FIG. 15 is a top view of the sub-assembly 30 with two tape cleaners 110 from FIG. 14. In FIG. 15, the tape cleaners 110 are fitted on plates 132 and 134. The adjustable tape guide 50a is also mounted on plate 132, and the adjustable tape guide 50b is mounted on plate 134. Once the tape cleaners 110 are mounted on the sub-assembly 30, the sub-assembly 30 is mounted on a work base that also contains a jig 124.

The jig 124 is provided with a head section 126 with a head contact surface 126a that is placed in contact with the magnetic head 42. The jig 124 also has a first tape cleaner section 128 and a second tape cleaner section 130. The jig 124 is shaped so that once the jig is positioned on the sub-assembly 30 with the contact surface 126a against the head, when the tape cleaners 110 are fitted onto the tape cleaner sections 128 and 130, the tape cleaners will be positioned a predetermined distance from the head 42 with a specific orientation, one tape cleaner being placed on each side of the head 42. If the tape cleaners are positioned correctly in the predetermined contact angle, the magnetic tape 38 should extend past the magnetic head 42, the tape cleaners 110, and the adjustable tape guides 50a and 50b along a proper tape path 52.

Figure 16A:
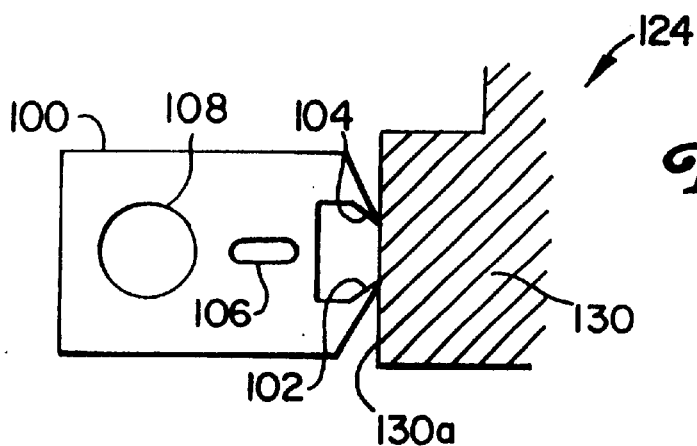
FIG. 16A is a top view of a first tape cleaner positioned against a first section of the jig of FIG. 15.

FIG. 16A is a top view showing how tape cleaner 100 (shown in FIG. 13) is placed against the jig 124 for placement on the sub-assembly 30. The slot 106 of tape cleaner 100 is inserted onto the positioning pin (not shown) on the sub-assembly 30. The two cleaner blades 102, 104 of the tape cleaner 100 are placed in contact with a surface 130a of the second tape cleaner section 130 of the jig 124. In this position, as shown in FIG. 16, the two cleaner blades 102 and 104 are in the predetermined position. Then, a screw (not shown) is inserted into the through-hole 108 to fix the tape cleaner 100 to the sub-assembly 30.

Figure 16B:
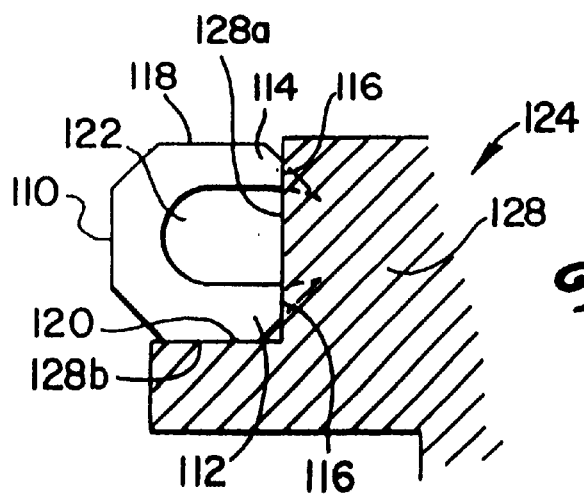
FIG. 16B is a top view of a second tape cleaner positioned against a second section of the jig of FIG. 15.

FIG. 16B is a top view showing how the tape cleaner 110 (shown in FIG. 14) is placed against the jig 124 for placement on the sub-assembly 30. The tape cleaner 110 is loosely attached to the plate 132 by a screw 136 (as shown in FIG. 15). Then, the second surface 114 of the tape cleaner 110 is placed in contact with the surface 128a of the first tape cleaner section 128 of the jig 124. At this time, since the screw 96a is loosely attached to the tape cleaner 110 in the hole 122, the first surface 116 and the third surface 120 of the tape cleaner 110 are aligned against the surfaces 128a and 128b of the jig 124, respectively. As shown in FIG. 16B, the two cleaner blades 112, 114 are positioned at predetermined positions that extend past the surface 128a of the jig 124 that touches the first surface 116 of the tape cleaner 110. Thereafter, the screw 132 is tightened to fix the tape cleaner 110 to the predetermined position on the sub-assembly 30.

Figure 16C:
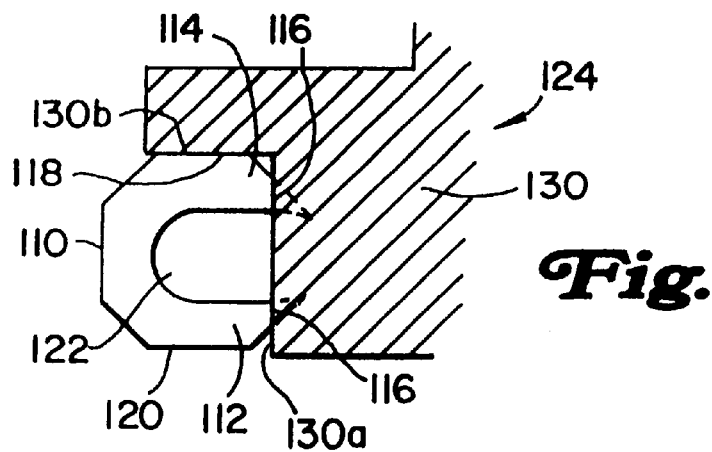
FIG. 16C is a top view of a first tape cleaner positioned against a second section of the jig of FIG. 15.

In addition, as shown in FIG. 16C, Applicants also contemplate that a second tape cleaner 110 can be used instead of a tape cleaner 100 (as shown in FIG. 16A) on the downstream side of the head 42. The only difference between mounting the tape cleaner 110 described above and a second tape cleaner 110 is that to mount a second tape cleaner 110, the tape cleaner section 130 of the jig 124 would have to have a surface 130b, generally symmetric to the surface 128b, for abutting the second surface 118 of the second tape cleaner 110. Where possible during the assembly of the magnetic tape apparatus, similar steps for positioning the two tape cleaners 110 occur simultaneously.

As is apparent from FIGS. 16A–C, since the tape cleaner 110 is substantially smaller than the tape cleaner 100, it will be easier to arrange the tape cleaner 110 between the magnetic head 42 and the adjustable tape guide 50a and between the magnetic head 42 and the adjustable tape guide 50b. With this configuration, dust that adheres to the magnetic tape will be removed and will not adhere to the magnetic head 42.

While various embodiments of the present invention have been described, it should be understood that other modifications, substitutions and alternatives may be apparent to one of ordinary skill in the art. Such modifications, substitutions and alternatives can be made without departing from the spirit and scope of the invention, which should be determined from the appended claims.

What is claimed is:

1. A magnetic tape apparatus for reading data from and writing data to a magnetic tape, comprising:

at least one first tape guide that maintains the magnetic tape along a tape path, said first tape guide having a movable portion that exerts a force against an edge of said magnetic tape, and when the magnetic tape moves out of the tape path in a first direction transverse to said tape path, said movable portion first yields by moving with the magnetic tape in said first transverse direction to accommodate the magnetic tape, and then moves in a second transverse direction opposite to said first direction to press the magnetic tape back into the tape path, whereby a transverse pressing force exerted against the magnetic tape by said movable portion maintains the magnetic tape along the tape path and prevents folding of the magnetic tape.

2. A magnetic tape apparatus according to a claim 1, wherein said at least one first tape guide further has a first guide surface 16 to guide the magnetic tape, said first guide surface having a width that is narrower than the width of the magnetic tape.

3. A magnetic tape apparatus according to claim 2, further comprising:

a magnetic head 18; and at least one second tape guide 11 having a second guide surface to guide the magnetic tape, said second guide surface having a width that is wider than the width of the magnetic tape; and wherein said tape path is defined by said magnetic head, said first tape guide and said second tape guide.

4. A magnetic tape apparatus according to claim 3, further comprising at least one additional first tape guide, and wherein said tape path includes a downstream part and an upstream part, said magnetic head dividing said upstream part from said downstream part, at least one said first tape guide being positioned on each said part and said second tape guide being positioned on either said part.

5. A magnetic tape apparatus according to claim 4, further comprising a machine reel and a file reel, and wherein said upstream part is located between said machine reel and said magnetic head, and said downstream side is located between said head and said file reel.

6. A magnetic tape apparatus according to claim 5, wherein said second tape guide is located on said upstream side and said tape path is defined in the order of one said first tape guide, said head, another said first tape guide and a second said tape guide.

7. A magnetic tape apparatus according to claim 5, wherein said file reel is located within a magnetic tape cartridge that is loaded onto the magnetic tape apparatus.

8. A magnetic tape apparatus according to claim 2, wherein the width of said guide surface of said first tape guide is narrower than the width of the magnetic tape by up to approximately 0.1 mm.

9. A magnetic tape apparatus according to claim 1, wherein said portion is a movable flange, and said first tape guide further includes a fixed flange placed on opposite edges of said magnetic tape, said movable flange being biased toward said fixed flange, said edge of said magnetic tape extending off of said first guide surface.

10. A magnetic tape apparatus according to claim 9, wherein said pressing force from said movable flange is in a range of approximately 20 gf to 30 gf.

11. A magnetic tape apparatus according to claim 9, further comprising a base, and wherein said first tape guide further includes:

a fixed shaft having a bottom and a top, said bottom being mounted to the base;

a roller defining said guide surface for guiding the magnetic tape that is placed against said guide surface, said roller being rotatably mounted on said shaft; and a top flange positioned at said top of said shaft and having said fixed flange and said movable flange, said fixed flange being fixed to said top of said fixed shaft, said movable flange being mounted on said shaft so that said movable flange slides axially along said shaft; and a coil spring positioned between said movable flange and said fixed flange for biasing said movable flange toward said roller, whereby folding of the magnetic tape is prevented.

12. A magnetic tape apparatus according to claim 1, further comprising at least one tape cleaner provided to remove material that adheres to the magnetic tape, said tape cleaner having a bottom surface and at least two cleaning blades, each blade defining a surface that generally extends perpendicular to said bottom surface, said blade surfaces positioned in nonparallel orientations relative to each other.

13. A magnetic tape apparatus according to claim 12, wherein said cleaning blades have distal ends that extend in a direction toward said tape guide path, and said tape cleaners further include at least one jig engaging surface set back from a distal end of said cleaning blades and face toward said distal ends and toward said tape guide path.

14. A magnetic tape apparatus according to claim 1, wherein said edge receiving said pressing force is a top edge of said magnetic tape.

15. A magnetic tape apparatus according to claim 1, wherein said pressing force is created by compression and expansion of a coil spring.

16. A magnetic tape apparatus according to claim 15, wherein said first tape guide further includes a flange having a movable part and a fixed part, said coil spring being placed between said fixed and movable parts so that said movable part is biased toward the magnetic tape.

17. A magnetic tape apparatus according to claim 1, wherein said magnetic tape is in a range approximately 8 $\mu$m to 12 $\mu$m thick.

18. A tape guide for guiding a magnetic tape in a magnetic tape apparatus with a base, comprising:

a fixed shaft having a bottom and a top, said bottom being mounted to the base;

a roller defining a guide surface for guiding a magnetic tape that is placed against said guide surface, said roller being rotatably mounted on said shaft; and a top flange positioned at said top of said shaft and having a fixed flange part and a movable flange part, said fixed flange part being fixed to said top of said fixed shaft, said movable flange part being mounted on said shaft so that said movable flange part slides axially along said shaft;

a bottom flange notably mounted on said shaft, said roller being positioned between said top and bottom flanges; and a coil spring positioned between said movable flange part and said fixed flange part for biasing said movable flange toward said bottom flange, wherein said movable flange engages an edge of said magnetic tape positioned along said guide surface, whereby folding of the magnetic tape is prevented.

* * * * *

UNITED STATES PATENT AND TRADEMARK OFFICE
CERTIFICATE OF CORRECTION

| | |
|---|---|
| PATENT NO. : 6,310,744 B1 | Page 1 of 1 |
| DATED : October 30, 2001 | |
| INVENTOR(S) : Kobayashi et al. | |

It is certified that error appears in the above-identified patent and that said Letters Patent is hereby corrected as shown below:

<u>Title page,</u>
Item [30], add:

-- [30] Foreign Application Priority Data
July 21, 1998   (JP)…………………..10-205090 --.

Item [56], References Cited, under FOREIGN PATENT DOCUMENTS add
-- 6282583  4/1987 (JP) --.
Add -- 2177112  7/1990 (JP) --.

<u>Column 14,</u>
Line 63, delete "16".

<u>Column 15,</u>
Line 1, delete "18".
Line 2, delete "11".

Signed and Sealed this

Twenty-seventh Day of August, 2002

*Attest:*

*Attesting Officer*

JAMES E. ROGAN
*Director of the United States Patent and Trademark Office*